United States Patent
Fujisaki

(10) Patent No.: US 11,297,236 B2
(45) Date of Patent: Apr. 5, 2022

(54) CAMERA DEVICE WITH HAND SHAKE CORRECTION FUNCTION

(71) Applicant: AAC Optics Solutions Pte. Ltd., Singapore (SG)

(72) Inventor: Yoshifumi Fujisaki, Osaka (JP)

(73) Assignee: AAC Optics Solutions Pte. Ltd., Singapore (SG)

( * ) Notice: Subject to any disclaimer, the term of this patent is extended or adjusted under 35 U.S.C. 154(b) by 0 days.

(21) Appl. No.: 16/790,685

(22) Filed: Feb. 13, 2020

(65) Prior Publication Data
US 2021/0203851 A1 Jul. 1, 2021

(30) Foreign Application Priority Data
Dec. 25, 2019 (JP) .............................. JP2019-235251

(51) Int. Cl.
*H04N 5/232* (2006.01)
*G03B 17/02* (2021.01)
*H04N 5/225* (2006.01)

(52) U.S. Cl.
CPC .......... *H04N 5/23287* (2013.01); *G03B 17/02* (2013.01); *H04N 5/2253* (2013.01); *G03B 2217/002* (2013.01)

(58) Field of Classification Search
CPC .. H04N 5/23287; H04N 5/2253; G03B 17/02; G03B 2217/002
See application file for complete search history.

(56) References Cited

U.S. PATENT DOCUMENTS

2020/0174270 A1* 6/2020 Enta ..................... G02B 27/646

* cited by examiner

*Primary Examiner* — Yogesh K Aggarwal
(74) *Attorney, Agent, or Firm* — W&G Law Group

(57) ABSTRACT

The present disclosure provides a camera device, which includes an anti-shake mechanism in the camera device including a deflection optical system without making the device large. An optical system is provided and includes, from an object side, a reflection member, an imaging lens set, and an imaging element. Image shake around an axis perpendicular to a plane formed by a first optical axis (O1) and a second optical axis (O2) is corrected by rotation of the reflection member, and image shake around the first optical axis (O1) is corrected by movement of a first set of lenses immediately following the reflection member.

8 Claims, 9 Drawing Sheets

CAMERA DEVICE WITH HAND SHAKE CORRECTION FUNCTION

TECHNICAL FIELD

The present disclosure relates to a camera device with a hand shake correction function.

BACKGROUND

With rapid development of camera technologies, lens driving devices are widely used in various photographing devices. It is particularly accepted by consumers to apply the lens driving devices into various portable electronic devices, such as a mobile phone, a tablet computer, etc.

A driving mechanism of the lens driving device suitable for a general portable electronic device is generally formed by a coil and a magnet, and the coil is fixed to an outer periphery of a carrier of the lens. When an electric current is applied to the coil, the coil moves the carrier of the lens along a direction of an optical axis of the lens under an effect of an electromagnetic force, thereby enabling focusing. Moreover, when a user holds an electronic device with his/her hand for photographing, shake of the lens driving device caused by shake of the hand can be corrected by driving in a direction perpendicular to the optical axis. However, for example, for small-sized optical devices mounted on a portable electronic device, it is difficult for a zoom optical system having a long total optical length to be directly mounted onto the portable electronic device, and a structure such as a deflecting structure is required.

For the optical system using a deflecting structure, shake correction is achieved sometimes by rotating a prism for deflecting light about two axes. However, when rotation is performed about an axis parallel to the optical axis of an entrance surface of the prism, sometimes a surrounding image will rotate and thus an anti-shake effect cannot be obtained.

Therefore, with a configuration in which the prism is rotated only in an axial direction respectively perpendicular to an optical axis of the incident surface of the prism and an optical axis of a set of imaging lenses and shake correction in the other axis direction is achieved by moving the imaging lens, the correction effect can be improved.

However, shifting the entire set of imaging lenses may increase weight and volume, resulting in an increase in a dimension of the actuator.

Therefore, if the least lenses are shifted, it may also contribute to miniaturization of the camera device.

PRIOR ART DOCUMENT

Patent Document

Patent document 1: JP 2014-66770
Patent document 2: JP 2015-141401

SUMMARY

Problem to be Solved

The present disclosure has been made in view of the above-mentioned problem, and an object thereof is to provide an anti-shake mechanism which is space-saving and will not increase the dimension of the camera device having a deflection optical system when used for hand shake correction of the camera device.

Solutions to the Problem

The object of the present disclosure is achieved as follows. Moreover, in the following description, in order to better illustrate the present disclosure, the numerals and the like in the drawings are labeled in parentheses, but the constituent elements of the present disclosure are not limited to these labeled elements, and those skilled in the art shall interpret them broadly within a technically understandable range.

The present disclosure is characterized in that a camera device in which an image shake suppression action is performed by optical elements constituting the imaging optical system according to shake applied to the imaging optical system is configured as follows. The optical elements of the imaging optical system include: a reflection member, which reflects a light beam incident from an object side along a first optical axis toward a direction along a second optical axis; and an imaging lens set, which is disposed closer to an image side in the optical axis direction than the reflection member. Image shake around an axis perpendicular to a plane formed by an optical axis of the imaging lens set and an optical axis of an object side reflected by the reflection member can be corrected by rotation of the reflection member, and image shake around an axis parallel to the reflected optical axis of the object side can be corrected by a first set of lenses immediately following the reflection member.

Two movable members are provided with an actuator for rotating or moving the movable members, and an image shake suppression action is performed based on shake applied to the imaging optical system.

When the actuator is a voice coil motor including a permanent magnet and a coil, an actuator support portion of the movable member supports either the permanent magnet or the coil.

Effects

As advantages of the present disclosure, according to the anti-shake mechanism of the deflection-type camera device of the present disclosure, image shake around the axis perpendicular to the plane formed by the optical axis of the imaging lens set and the optical axis of the object side reflected by the reflection member can be corrected by rotation of the reflection member, and image shake around the axis parallel to the reflected optical axis of the object side can be corrected by the first set of lenses immediately following the reflection member. In this way, compared with using only the reflection member to perform correction of hand shake around two axes, the present disclosure can reduce a performance influence on an image surface. In addition, since a movable range can be limited to a minimum range with respect to a hand shake correction angle, a purpose of adopting a more efficient anti-shake mechanism in a miniaturized portable electronic device can be achieved, and moreover, the photographed image has a good quality.

DESCRIPTION OF EMBODIMENTS

Figure 1:
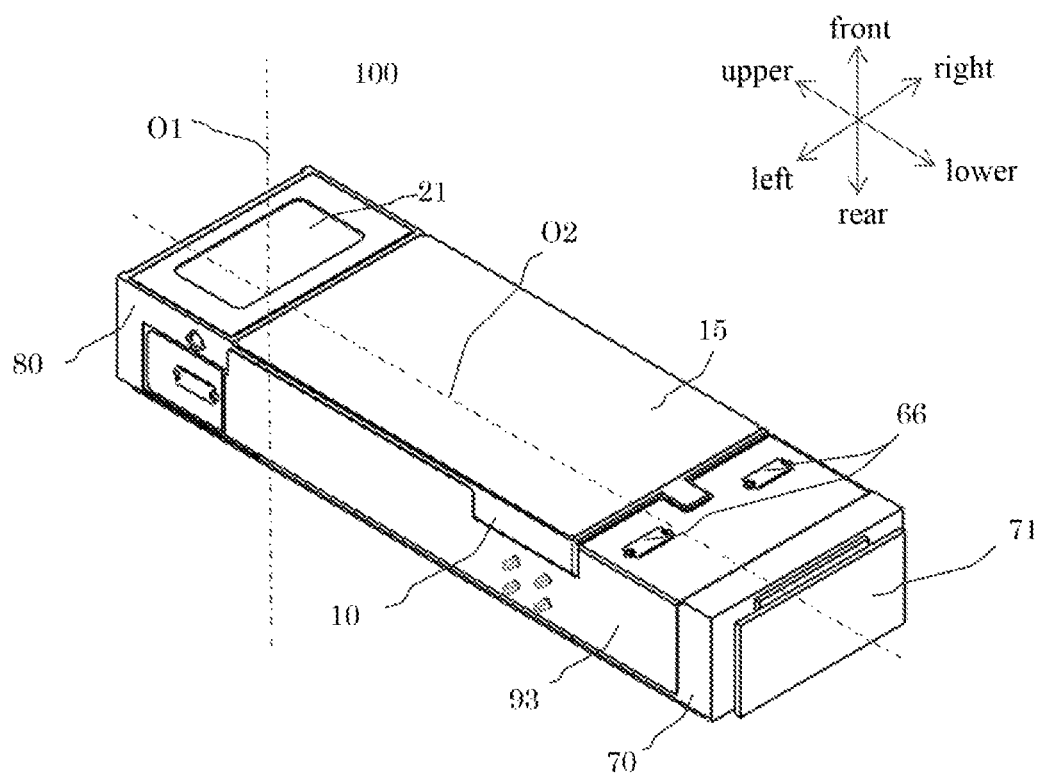
FIG. 1 is a perspective view of a deflection-type camera device as viewed from according to an embodiment of the present disclosure.
Figure 2:
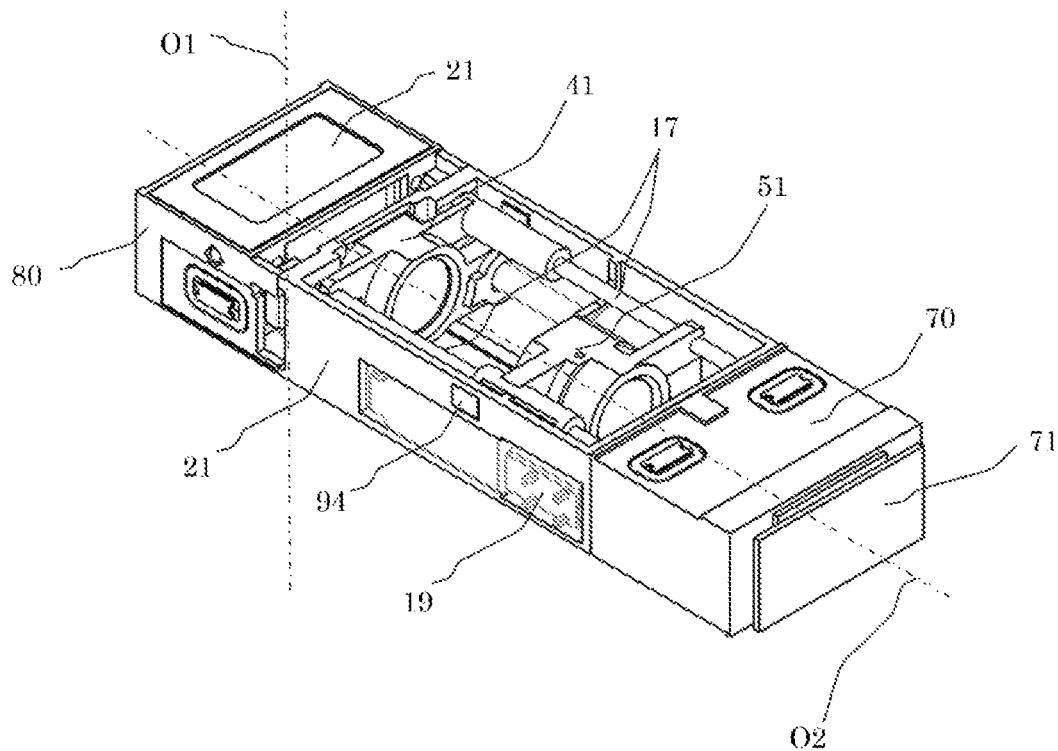
FIG. 2 is a perspective view of a deflection-type camera device as viewed from bottom, with a front cover plate, a rear cover plate, and a flexible substrate being removed according to an embodiment of the present disclosure.
Figure 3:
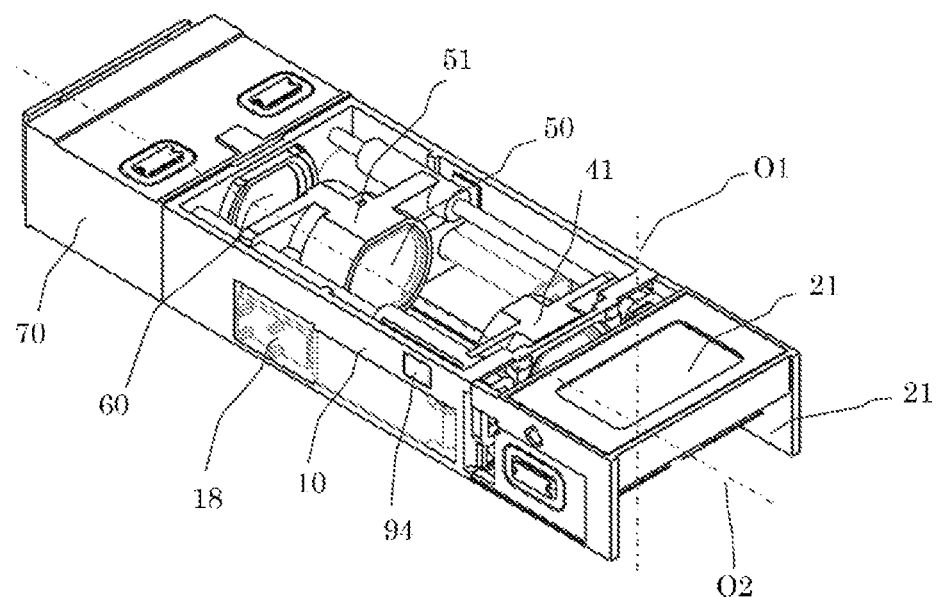
FIG. 3 is a perspective view of a deflection-type camera device as viewed from top, with a front cover plate, a rear cover plate, and a flexible substrate being removed according to an embodiment of the present disclosure.

Hereinafter, the present disclosure will be described in detail with reference to the accompanying drawings.

FIG. 1 to FIG. 12 are diagrams showing a deflection-type camera device 100 according to the present disclosure.

FIG. 1 to FIG. 13 show a camera device and its constituent elements according to the embodiment of the present disclosure.

An imaging optical system of the deflection-type camera device 100 is a deflection optical system including or consisting of, from an object side, a prism 21 used as a reflection member, a first set 30 of lenses, a second set 40 of lenses, a third set 50 of lenses, and a fourth set 60 of lenses, and an imaging element 71. The light beam is reflected by the prism 21.

The imaging optical system is a zoom optical system that changes an imaging magnification by respectively moving the second set 40 of lenses and the third set 50 of lenses toward an optical axis direction. In addition, the fourth set 60 of lenses moves toward the optical axis direction so as to function as an autofocus that performs focus adjustment according to a shooting distance. In other embodiments, the present disclosure is also applicable to an optical system with a fixed focus.

A light beam that comes from an imaged object and is incident on an entrance surface 21-$a$ of the prism 21 along a first optical axis O1 is reflected by a reflecting surface 21-$b$ of the prism 21 toward a direction along a second optical axis O2 and then exits from an exit surface 21-$c$. Then, the light beam is imaged on an imaging surface of the imaging element 71 after passing through the first set 30 of lenses, the second set 40 of lenses, the third set 50 of lenses, and the fourth set 60 of lenses disposed on the second optical axis O2.

Figure 9:
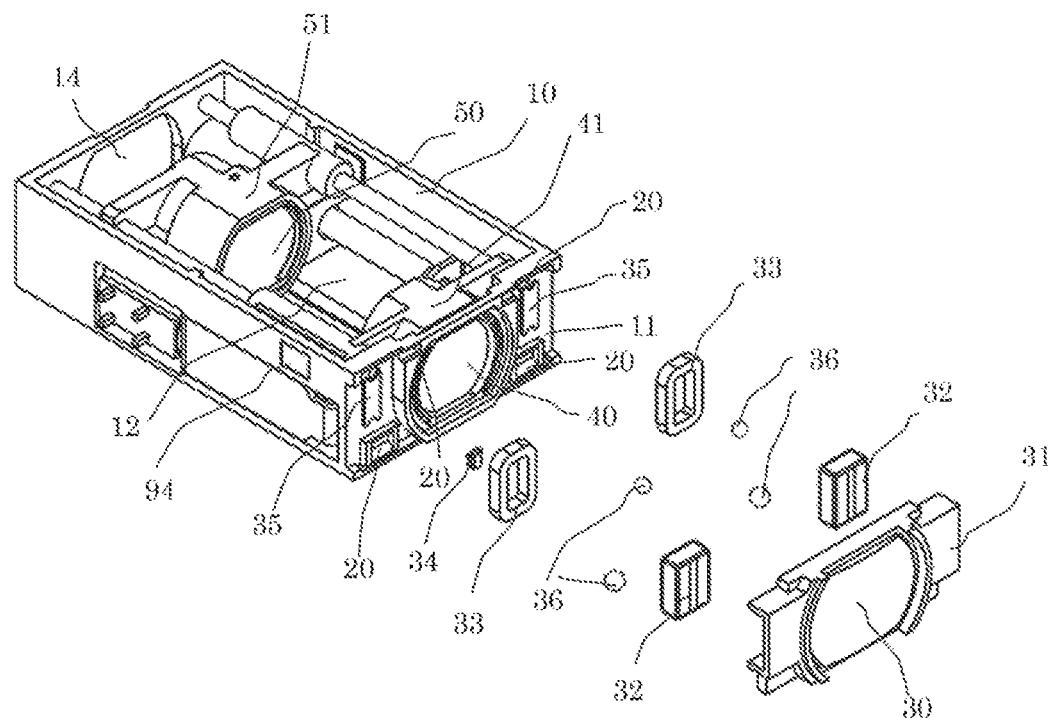
FIG. 9 is a perspective exploded view of an anti-shake mechanism of a first set of lenses of a deflection-type camera device as viewed from top according to an embodiment of the present disclosure.
Figure 10:
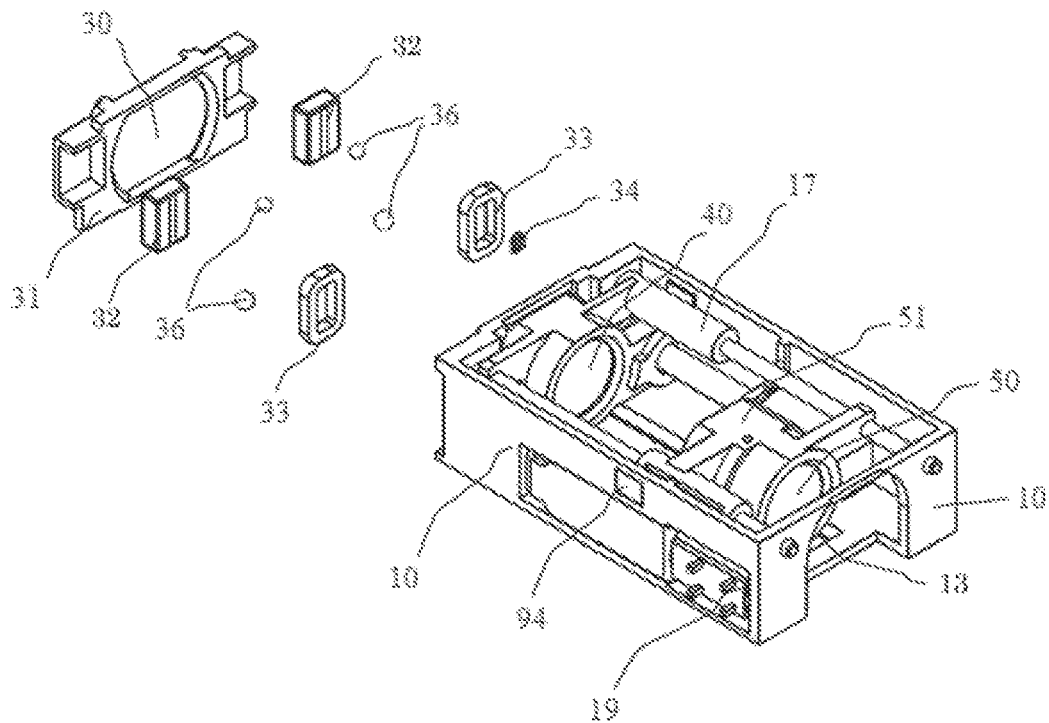
FIG. 10 is a perspective exploded view of an anti-shake mechanism of a first set of lenses of a deflection-type camera device as viewed from bottom according to an embodiment of the present disclosure.
Figure 11:
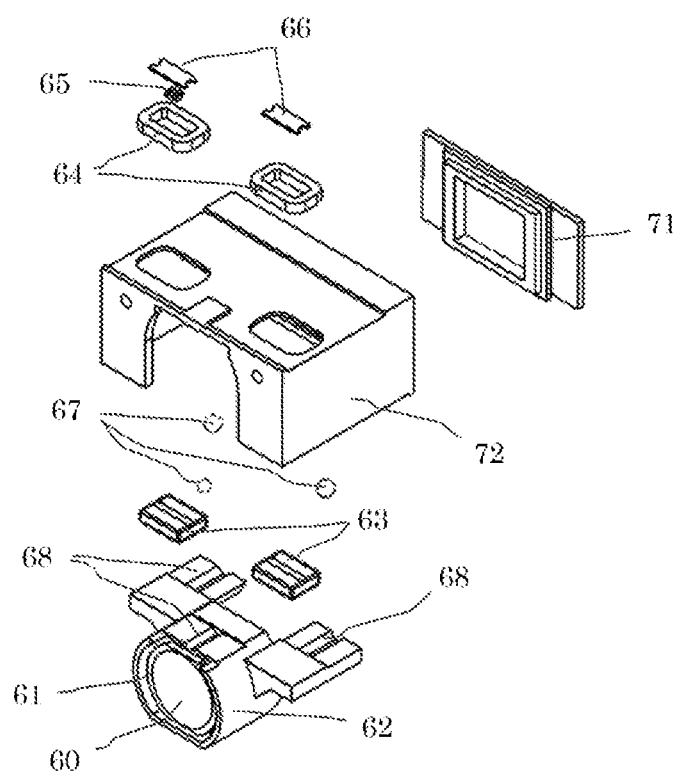
FIG. 11 is a perspective exploded view of an imaging element unit of a deflection-type camera device as viewed from top according to an embodiment of the present disclosure.
Figure 12:
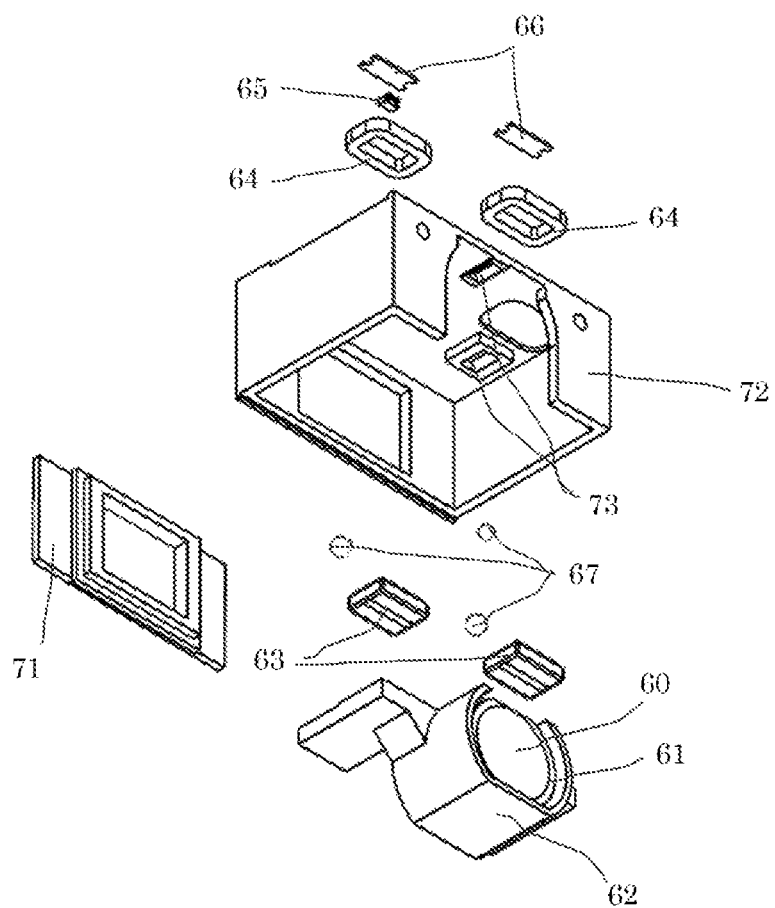
FIG. 12 is a perspective exploded view of an imaging element unit of a deflection-type camera device as viewed from bottom according to an embodiment of the present disclosure.

The deflection-type camera device 100 includes a housing 10 as an imaging lens set holding frame that holds the first set 30 of lenses, the second set 40 of lenses, and the third set 50 of lenses. As shown in FIG. 9 and FIG. 10, the housing 10 includes: an upper fixing part 11, which holds a prism anti-shake unit 80 containing the prism 21 and a prism anti-shake base, and forms an anti-shake mechanism for the first set of lenses; a front side opening part 12, which receives the second set 40 of lenses and the third set 50 of lenses, the second set 40 of lenses and the third set 50 of lenses being used as zoom lenses; a rear side opening part 13, which is opened at a side opposite to the front side opening part 12; and a lower fixing part 14, which fixes the imaging element unit 70 which holds the fourth set 60 of lenses and the imaging element.

The prism anti-shake unit 80 containing the prism 21 is fixed to the upper fixing part 11. At the front side opening part 12, a second lens set frame 41 and a third lens set frame 51 respectively holding the second set 40 of lenses and the third set 50 of lenses are supported by two shafts 17, and are held in such a manner that they can move forward and backward along the second optical axis O2. The imaging element unit 70 holding the fourth set 60 of lenses and the imaging element 71 is fixed to the lower fixing part. In addition, two stepping motors A and B (18, 19) that respectively cause the second set 40 of lenses and the third set 50 of lenses to perform zooming action are fixed at a side surface of the housing 10.

Figure 4:
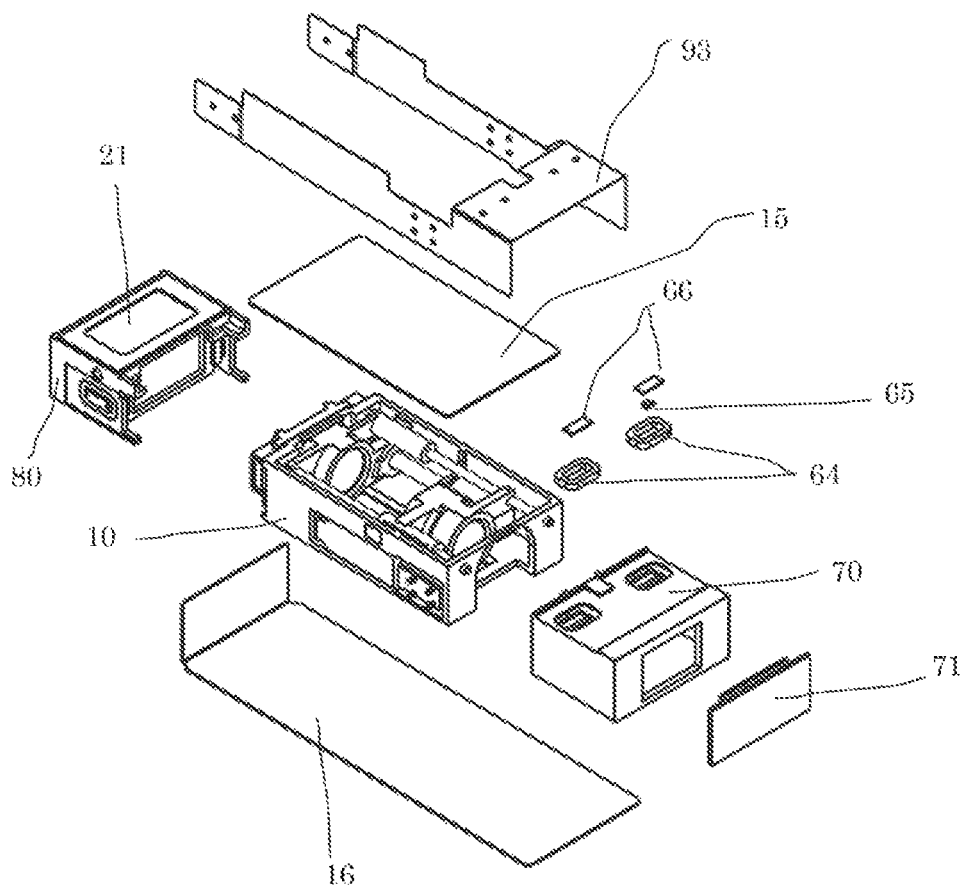
FIG. 4 is a perspective exploded view of a deflection-type camera device as viewed from bottom according to an embodiment of the present disclosure.
Figure 5:
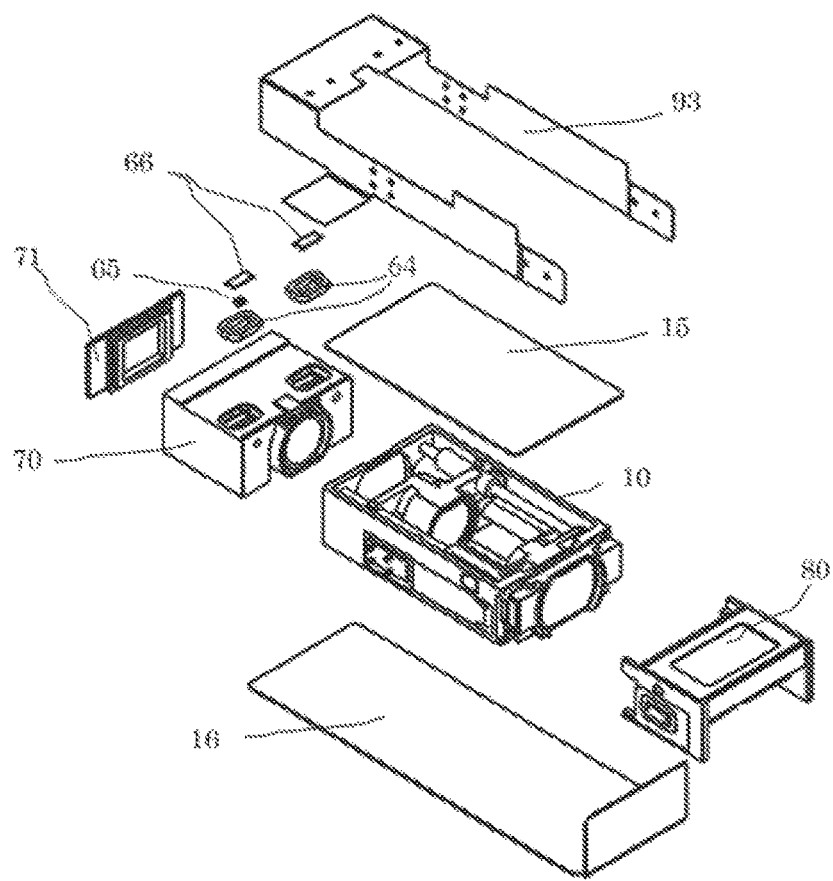
FIG. 5 is a perspective exploded view of a deflection-type camera device as viewed from top according to an embodiment of the present disclosure.
Figure 6:
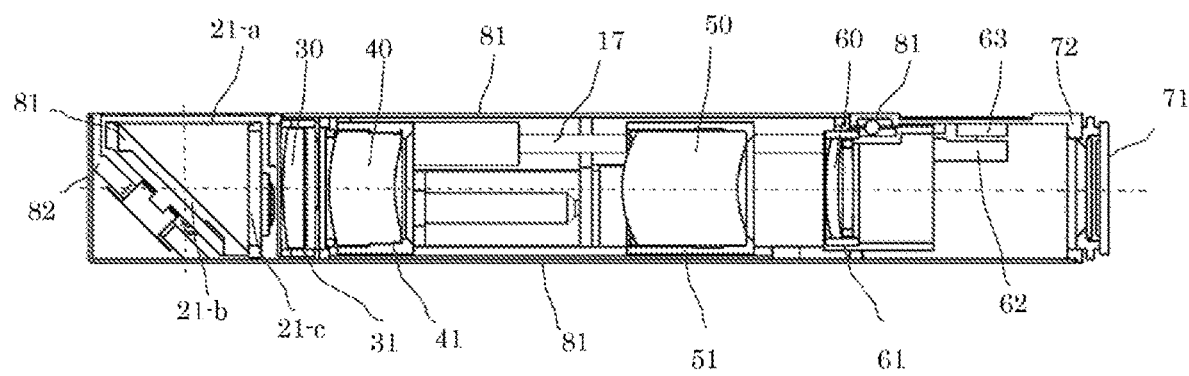
FIG. 6 is a cross-sectional view of a deflection-type camera device in a cross-sectional plane formed by a first optical axis and a second optical axis according to an embodiment of the present disclosure.
Figure 7:
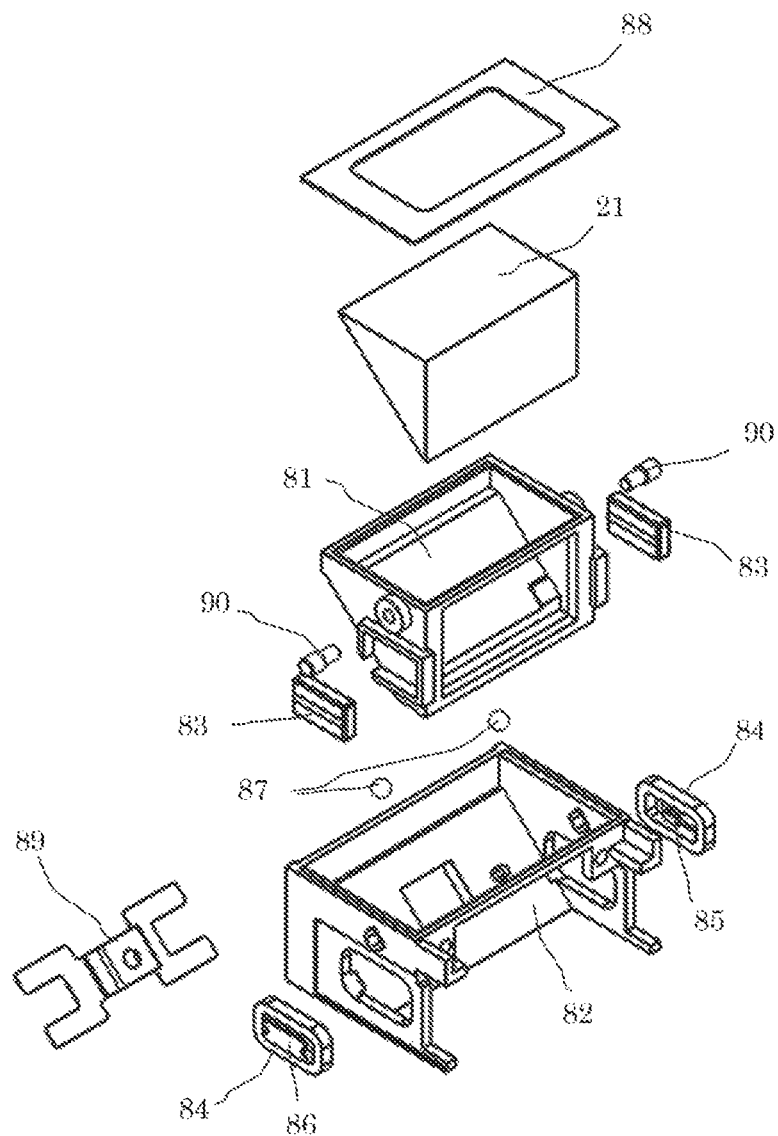
FIG. 7 is a perspective exploded view of a prism anti-shake unit of a deflection-type camera device as viewed from bottom according to an embodiment of the present disclosure.
Figure 8:
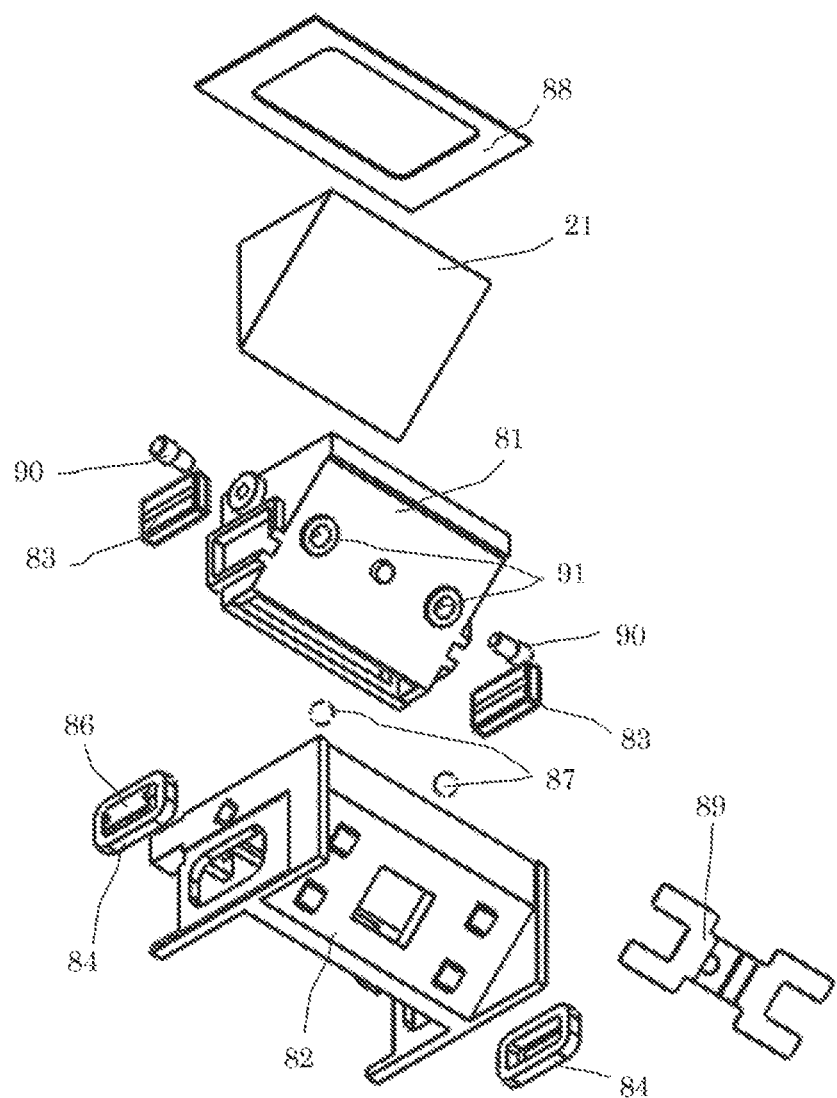
FIG. 8 is a perspective exploded view of a prism anti-shake unit of a deflection-type camera device as viewed from top according to an embodiment of the present disclosure.

The front side opening part 12 and the rear side opening part 13 of the housing 10 are blocked by a front side cover plate 15 and a rear side cover plate 16 (FIGS. 1, 4 and 5).

In addition, a flexible substrate 93 for electrically connecting an electrical member is arranged around the housing 10, and a pattern is wired to an external substrate and a connection portion.

The second set 40 of lenses and the third set 50 of lenses, which function as zoom lenses, are respectively held at the second lens set frame 41 and the third lens set frame 51, and can move forward and backward along the optical axis direction through the stepping motors A and B (18, 19). Output shafts of the stepping motors A and B (18, 19) become leading screws that thread-engage with nut members, and the nut members have internal threads that engage with rotation stopping slots of the second lens set frame 41 and the third lens set frame 51. Therefore, as long as a given pulse is input into the stepping motors A and B (18, 19), a rotation with a rotation angle amount will be performed in response to the pulse. Since rotation of the nut members is limited by the second lens set frame 41 and the third lens set frame 51, the leading screws that rotate the given rotation angle can make the second lens set frame 41 and the third lens set frame 51 move forward and backward along the optical axis direction with a moving distance calculated based on a screw pitch and the rotation angle. In this way, a spacing between the sets corresponding to the zoom step can be controlled.

In addition, pulse driving of the stepping motors A and B (18, 19) in the embodiment is open-loop control, and an origin determination based on a light sensor 94 is performed respectively.

The fourth set 60 of lenses which functions as autofocus is held at the fourth lens set frame 61. The fourth lens set frame 61 and two permanent magnets 63 for autofocus of the fourth set of lenses are fixed at a holder 62 for the fourth lens set frame, and two coils 64 for autofocus of the fourth set of lenses and a Hall sensor 65 for autofocus of the fourth set of lenses are connected to the flexible substrate 93 and fixed at an imaging element holder 72, so as to form a voice coil motor. In addition, three balls for autofocus of the fourth set of lenses that are arranged opposite to the holder 62 for the fourth lens set frame and the imaging element holder 72 are provided between three V slots 48 of the holder for the fourth lens set frame and a V slot 73 of the imaging element holder. In this way, the holder 62 for the fourth set of lenses is movable with respect to the imaging element holder 72 with a small friction force along a direction parallel to the optical axis.

In addition, yokes 66 for autofocus of the fourth set of lenses is provided at a back surface of the flexible substrate 93, and the flexible substrate 93 connects the two coils 64 for autofocus of the fourth set of lenses that are arranged opposite to the two permanent magnets 63 for autofocus of the fourth set of lenses. The yokes 66 for autofocus of the fourth set of lenses function as magnetic springs that are held at a given position (a center of a movement range in this embodiment) by magnetism with the permanent magnets for autofocus of the fourth set of lenses.

Since the imaging element holder 72 is fixed to the two shafts 17 fixed to the housing 10, the optical axis can be combined with high accuracy with respect to frames of other sets of lenses.

The prism 21 and two permanent magnet 83 for anti-shake of the prism are fixed to a prism holder 81. In addition, two conical slots 91 of the prism holder are provided at an outer side of a surface covering the reflecting surface 21-*c* of the prism, the conical slots 91 of the prism holder are used to hold two balls for anti-shake of the prism, and the two balls for anti-shake of the prism become rotation shafts. In addition, at a surface, which is arranged opposite to the conical slots 91 of the prism holder, of an prism anti-shake base 82 as a base member, a conical slot 92 of the prism anti-shake base is similarly formed and by mutually abutting against a ball 87 for anti-shake of the prism disposed there between, rotation can be performed with small friction force and a high accuracy. After abutting assembling, a leaf spring 89 is positioned and fixed to a cylindrical protrusion of the prism holder 81, in such a manner that the four curved arms apply a force to a protrusion of the prism anti-shake base 82 along a direction in which the prism holder 81 and the prism anti-shake base 82 mutually abut against the ball 87 for anti-shake of the prism, thereby preventing ball falling due to poor posture or impact.

Two coils 84 for anti-shake of the prism and one Hall sensor 85 for anti-shake of the prism, which are connected to the flexible substrate 93, are fixed to the prism anti-shake base 82, and form a voice coil motor with the two permanent magnets 83 for anti-shake of the prism fixed to the prism holder 81.

In addition, a yoke 86 for anti-shake of the prism is provided at a back surface of each of the two coils 84 for anti-shake of the prism facing the two permanent magnets 83 for anti-shake of the prism, and the yoke 86 for anti-shake of the prism functions as a magnetic spring held at a predetermined position (a center of a movement range in this embodiment) by magnetism with the permanent magnet 83 for anti-shake of the prism.

After the prism holder 81 is assembled, a stop pin 90 is fixed to the prism holder 81, and with a hole of the prism anti-shake base 82 that is larger than a diameter of the stop pin 90, movement amount of the rotation direction can be limited. The movement amount is set to be slightly larger than an effective correction amount, for correction of the Hall sensor 85 for anti-shake of the prism.

The prism anti-shake unit 80 is fixed to the two shafts 17 fixed to the housing 10, so that the optical axis can be combined with high accuracy with respect to other lens set frames.

The first set 30 of lenses is held at a first lens set frame 31 where two permanent magnets 32 for anti-shake of the first set of lenses is fixed. At the upper fixing part 11 of the housing 10, two coils 33 for anti-shake of the first set of lenses and one Hall sensor 34 for anti-shake of the first set of lenses, which are connected to the flexible substrate 93, are fixed at positions opposite to the two permanent magnets 32 for anti-shake of the first set of lenses. It is configured that the first lens set frame 31 is arranged in four V slots 20 of the housing 10, can move only in left and right directions relative to the housing 10, and can move only in left and right directions through the ball for anti-shake of the first set of lenses.

In addition, yokes 35 for anti-shake of the first set of lenses are provided at a back surface of the flexible substrate 93 connected to the two coils 33 for anti-shake of the first set of lenses, the two coils being arranged opposite to the two permanent magnets 32 for anti-shake of the first set of lenses. By means of magnetism with the permanent magnets 32 for anti-shake of the first set of lenses, the yokes 35 for anti-shake of the first set of lenses function as magnetic springs that apply force to the first lens set frame 31 in the direction toward the housing 10 and are held at a given position (a center of a movement range in this embodiment).

The first lens set frame 31 is configured to be movable only in left and right directions. In addition the permanent magnets 32 for anti-shake of the first set of lenses, the coils 33 for anti-shake of the first set of lenses, and the balls 36 for anti-shake of the first set of lenses, which form the voice coil motors, are also symmetrically arranged at two sides of the first set of lenses in the movement direction of the first lens set frame 31, thereby contributing to miniaturization of the camera device 100 without increasing a thickness of the camera device 100.

In addition, although not shown in the figures, a stopper limiting its movement amount is provided between the first lens set frame 31 and the housing 10, so that a movement amount that is equivalent to a hand shake correction amount is ensured, and correction of the Hall sensor 34 for anti-shake of the first set of lenses can be performed.

In this way, the first lens set frame 31 can be mounted into the housing 10 from the outside, and thus assembling thereof is simple.

Figure 13:
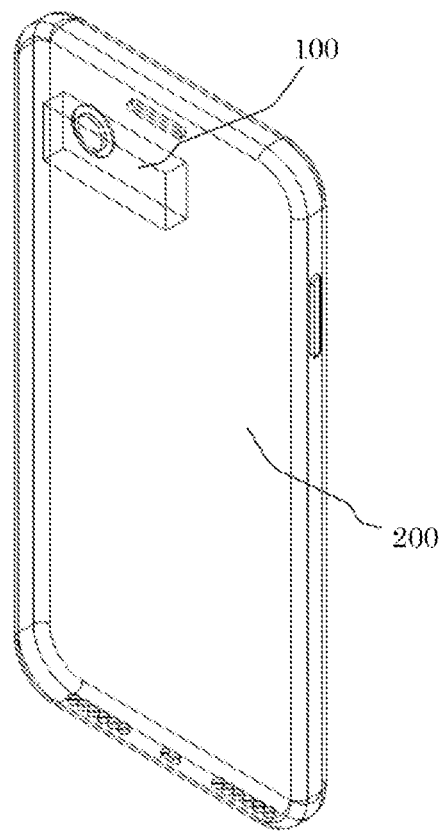
FIG. 13 illustrates a portable electronic device (portable information terminal) containing a deflection-type camera device according to the present disclosure.

The above-mentioned deflection-type camera device 100 can also be used in a camera device 100 for a portable information device 200, such as smart phone, a feature phone, or a tablet device, as shown in FIG. 13.

The above description has described preferred embodiments of the present disclosure, and a protection scope of the present disclosure is not limited to these embodiments. Any equivalent modification or change made by those skilled in the art based on the present disclosure shall fall into the inventions defined by claims of the present disclosure.

REFERENCE NUMERALS

10 . . . housing
11 . . . upper fixing part
12 . . . front side opening part
13 . . . rear side opening part
14 . . . lower fixing part
15 . . . front side cover plate
16 . . . rear side cover plate
17 . . . shaft
18 . . . stepping motor A
19 . . . stepping motor B
20 . . . V slot of the housing
21 . . . prism
21-a . . . entrance surface of the prism
21-b . . . reflecting surface of the prism
21-c . . . exit surface of the prism
30 . . . first set of lenses
31 . . . first lens set frame
32 . . . permanent magnet for anti-shake of the first set of lenses
33 . . . coil for anti-shake of the first set of lenses
34 . . . Hall sensor for anti-shake of the first set of lenses
35 . . . yoke for anti-shake of the first set of lenses
36 . . . ball for anti-shake of the first set of lenses
37 . . . V slot of the first lens set frame
40 . . . second set of lenses
41 . . . second lens set frame
50 . . . third set of lenses
51 . . . third lens set frame
60 . . . fourth set of lenses
61 . . . fourth lens set frame
62 . . . holder for the fourth lens set frame
63 . . . permanent magnet for autofocus of the fourth set of lenses
64 . . . coil for autofocus of the fourth set of lenses
65 . . . Hall sensor for autofocus of the fourth set of lenses
66 . . . yoke for autofocus of the fourth set of lenses
67 . . . ball for autofocus of the fourth set of lenses
68 . . . V slot of the holder for the fourth lens set frame
70 . . . imaging element unit
71 . . . imaging element substrate
72 . . . imaging element holder
73 . . . V slot of the imaging element holder
80 . . . prism anti-shake unit
81 . . . prism holder
82 . . . prism anti-shake base
83 . . . permanent magnet for anti-shake of the prism
84 . . . coil for anti-shake of the prism
85 . . . Hall sensor for anti-shake of the prism
86 . . . yoke for anti-shake of the prism
87 . . . ball for anti-shake of the prism
88 . . . prism opening part sheet
89 . . . leaf spring
90 . . . stop pin
91 . . . conical slot of the prism holder
92 . . . conical slot of the prism anti-shake base
93 . . . flexible substrate
94 . . . optical sensor
100 . . . deflection-type camera device
200 . . . portable information device
O1 . . . first optical axis
O2 . . . second optical axis

What is claimed is:

1. An anti-shake mechanism of a deflection-type camera device, wherein the deflection-type camera device is an optical system comprising a reflection member having a reflecting surface configured to deflect an optical axis, and hand shake correction is performed according to a shake applied to the optical system, wherein the reflection member is arranged to be closer to an object side than an imaging lens set; and in an imaging surface, image shake around an axis perpendicular to a plane formed by a first optical axis (O1) and a second optical axis (O2) is corrected by rotation of the reflection member, and image shake around the first optical axis (O1) is corrected by a first set of lenses immediately following the reflection member;

a mechanism portion configured to correct the image shake around the axis perpendicular to the plane formed by the first optical axis (O1) and the second optical axis (O2) in the imaging surface by the rotation of the reflection member is movably held by a reflection member holding frame that holds the reflection member, and a mechanism portion configured to correct the image shake around the first optical axis (O1) in the imaging surface by the first set of lenses immediately following the reflection member is movably held by a first lens set frame that holds the first set of lenses;

a first electromagnetic actuator configured to rotate the reflection member holding frame is provided between the reflection member holding frame and a base member, and a second electromagnetic actuator configured to move the first lens set frame is provided between the first lens set frame and a imaging lens set holding frame.

2. The anti-shake mechanism of the deflection-type camera device as claim 1, wherein the first lens set frame is formed at an object side surface of the imaging lens set holding frame.

3. The anti-shake mechanism of the deflection-type camera device as described in claim 1, wherein the first electromagnetic actuator and the second electromagnetic actuator are voice coil motors.

4. The anti-shake mechanism of the deflection-type camera device as described in claim 1, wherein a plurality of second electromagnetic actuators is arranged at two ends of the first set of lenses in a movement direction of the first lens set frame.

5. The anti-shake mechanism of the deflection-type camera device as described in claim 1, wherein the reflection member is a prism.

6. The anti-shake mechanism of the deflection-type camera device as described in claim 1, wherein the reflection member is a reflector.

7. A camera, comprising the anti-shake mechanism of the deflection-type camera device as described in claim 1.

8. A portable electronic device, comprising the camera as described in claim 7.

* * * * *